Figure 1:
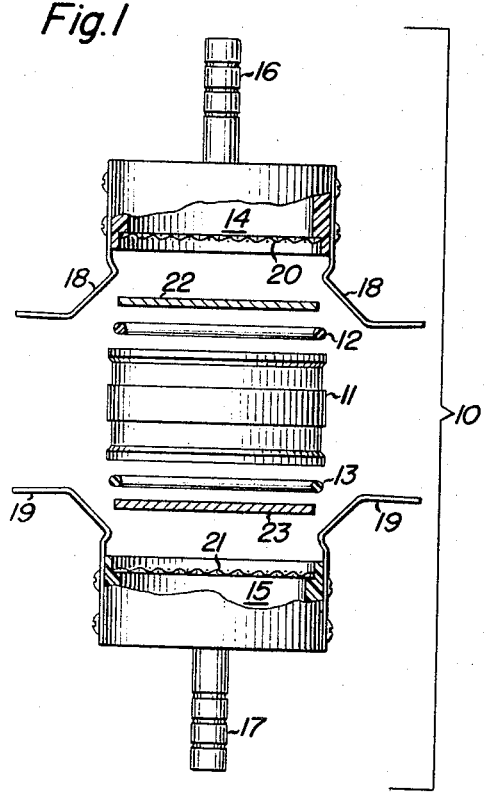
Figure 2:
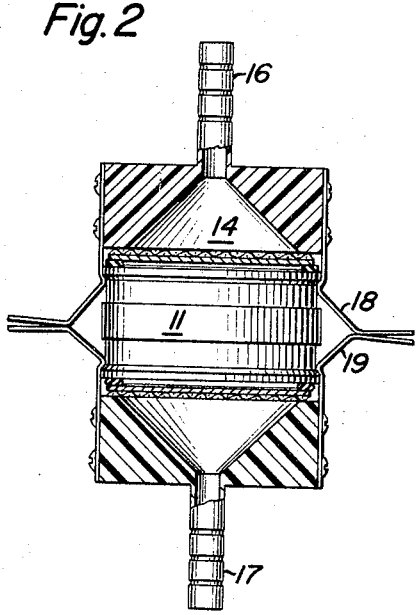
Figure 3:
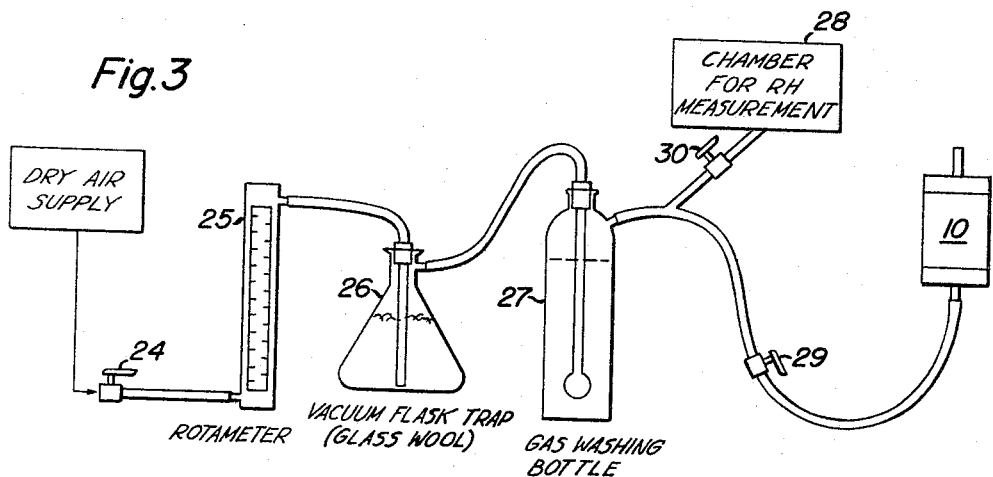

March 14, 1967     M. D. ORLANDO     3,308,558

ENVIRONMENTAL CHAMBER

Filed May 14, 1964

INVENTOR.
Michael D. Orlando

BY: Harry M. Saragovitz,
Edward J. Kelly &
Herbert Berl
                ATTORNEYS.

United States Patent Office 3,308,558
Patented Mar. 14, 1967

3,308,558
ENVIRONMENTAL CHAMBER
Michael D. Orlando, Frederick, Md., assignor to the United States of America as represented by the Secretary of the Army
Filed May 14, 1964, Ser. No. 367,900
3 Claims. (Cl. 34—218)

The invention described herein may be manufactured and used by or for the Government of the United States of America for governmental purposes, without the payment of any royalty thereon.

This invention relates to a small environmental chamber for the study of aerosols. The invention also relates to a process for using such a chamber.

Research in microbial aerobiology depends upon generating reproducible aerosols in controlled environments and for studying the behavior of these aerosols in time. The most important biological factors which influence airborne microorganisms are particle size, solar radiation, relative humidity, temperature and time. The sum effect of these factors is called biological decay.

Large cloud chambers of various geometries have been constructed in order to test properties such as the biological decay of microbial aerosols. Illustrative of these are those disclosed by Wolfe in Bacteriological Reviews, 25, No. 3, pages 194 to 202. However, these chambers are expensive to build and time consuming to operate. What was needed was a much simpler device which, although not measuring all the quantitative parameters of microbial aerosols, could be effectively used in the laboratory for screening purposes, with the ultimate tests being performed in the large cloud chambers. One of the problems to be overcome in the design of such a device was ensuring that all of the aerosolized particles were retained and none allowed to escape. The magnitude of this problem is more apparent when it is considered that microbial particles are usually under 20 microns in size, and quite often 1 to 5 microns in size.

It is an object of this invention therefore, to provide for rapidly and inexpensively measuring environmental influences upon the particles of an aerosol.

It is a further object of this invention to provide for rapidly and inexpensively measuring the influence of various factors upon the biological decay of microbial aerosols.

The invention comprises employing a modified fluidization technique wherein dense bed fluidization of the aerosol material is induced with an atmosphere of chosen characteristics.

An understanding of the invention is facilitated by reference to the drawings, in which:

FIGURE 1 is an exploded view of the chamber comprising my invention;

FIGURE 2 is a cross section of the assembled chamber; and

FIGURE 3 is a schematic of a system employing my chamber for exposing particulate material to air at any relative humidity.

Referring now to FIGURES 1 and 2, 10 is the complete environmental chamber unit of the invention. Hollow cylinder 11, which has both ends open, forms the central portion of the chamber unit. Gaskets 12 and 13 are fitted into grooves at each end of hollow cylinder 11. The chamber has identical top and bottom sections 14 and 15, each of which has a conical cavity therein which opens to the atmosphere through hollow stems 16 and 17, respectively. The base of the conical cavity communicates with the opening in hollow cylinder 11. The top and bottom sections 14 and 15 are attached to cylinder 11 by means of clamps 18 and 19, which fit into grooves on cylinder 11 by spring action thus forming a chamber for retaining the particles to be tested. Three clamps on each of the top and bottom sections located 120° apart are sufficient to obtain secure fastening. Securely fastened to that part of the top and bottom sections adjacent the cylinder 11 are screens 20 and 21. Membrane filters 22 and 23 are placed upon the screens, and the unit assembled as shown in FIGURE 2 by means of clamps 18 and 19.

The chamber unit comprising cylinder 11 and top and bottom sections 14 and 15, may be constructed of any suitable material. A satisfactory chamber was made of polystyrene. The size of the chamber is not critical. However, one of the advantages of the chamber of this invention is the fact that it is relatively small in size, and is used on a laboratory scale. A chamber has been used successfully that is of a size such that ordinary laboratory hosing may be fitted onto the stems, as shown in FIGURE 3.

The porosity of the particular membrane filters employed is chosen so as to retain within the chamber all particles above the smallest size desired to be tested. By way of example membrane filters having a porosity of 0.89 micron (the AA type manufactured by the Millipore Filter Corp.) were employed when it was desired to test particles having a particle size range down to about 1 micron. The upper limit of the particle size range depends upon the material to be tested.

As a specific example of one use of the chamber, reference is made to the system illustrated in FIGURE 3. This system is used to test the affect of air having a particular relative humidity upon the viability of microbial particles.

In the system of FIGURE 3, dry compressed air is supplied from a source through valve 24 to a rotameter 25. The flow rate is adjusted to about 0.1 cubic foot per minute by means of valve 24. From the rotameter the compressed air is circulated to a glass wool filter trap 26 to eliminate gross impurities. The air is then passed through a gas washing bottle 27. The gas washing bottle contains a saturated chemical solution to control the relative humidity of the air. In order to maintain a constant RH of 85 percent, a series of two gas washing bottles containing only water is used, with the temperature of the system being held at 75° F. From the gas washing bottle, the air is circulated to a chamber 28 for measuring the relative humidity by closing valve 29 and opening valve 30. The relative humidity is measured by use of wet and dry bulb thermometers and an Aminco hygrometer. The dry air supply, valve rotameter, filter trap, gas washing bottle and environmental chamber are operably interconnected with suitable gas conduit means, such as laboratory hosing.

The material to be tested is placed in the environmental chamber. This material may be any of the microbial materials listed at column 11 of Patent No. 2,897-600 to Graham et al. The chamber and contents are weighed, and the chamber connected to the system as shown in FIGURE 3. When the RH of the air has reached equilibrium, valve 30 is closed and valve 29 opened. The air flows through the environmental chamber and fluidizes the microbial material, forming a small contained aerosol.

After exposure for a selected period of time, the chamber and contents are removed from the system and again weighed. The amount of moisture which the environmental chamber and filters will retain when operated under the same conditions without any subject material is deducted in order to obtain the corrected moisture adsorption of the material. The influence of relative humidity upon the viability of the microbial material is then readily determined by conventional culturing techniques.

It is obvious that factors affecting biological decay other than relative humidity may be tested with my chamber. Ultraviolet lamps may be used to test the influence of solar radiation on microbial particles by using a chamber that is transparent to ultraviolet radiation. The influence of time on biological decay is always inherently tested. The chamber of my invention may also be used to study the influence upon viability of microorganisms of various gaseous environments, such as oxygen, nitrogen, etc.; of temperature; and of anti-microbial agents.

The chamber of my invention is not confined to testing microbial materials. It may be used to test the influence of environmental conditions upon the small particles of any material which is to be aerosolized, such as insecticides, herbicides, and so forth.

I claim:

1. A small environmental chamber unit for the study of aerosols comprising: a hollow cylinder having open ends; a top means on the top of said cylinder having a conical cavity therein, the apex of said cavity opening into a hollow stem which communicates with the atmosphere, the base of said conical cavity opening into said hollow cylinder, and a screen located at said base of said conical opening; a bottom means on the bottom of said cylinder constructed identical to said top means; a first membrane filter having a porosity of less than one micron and located between said cylinder and the screen of said top means; a second membrane filter having a porosity of less than one micron and located between said cylinder and the screen of said bottom means; gasket means located in a channel at each end of said cylinder for forming a seal between said cylinder and said top and bottom means; and clamp means attached to said top and said bottom means clamping said top and said bottom to said cylinder.

2. A system for exposing the particles of an aerosol to air at a particular relative humidity comprising the combination, in series, of a dry air supply means, a valve and rotameter to control the flow rate of dry air, filter means for filtering out gross impurities, a gas washing bottle for imparting a chosen relative humidity to said dry air, an environmental chamber having air inlet and outlet means and membrane filter means associated therewith, and suitable conduit means operably interconnecting said air supply, valve, rotameter, filter, washing bottle, and chamber, respectively, whereby said particles in said chamber may be readily fluidized with said air of chosen relative humidity.

3. A small environmental chamber unit for the study of aerosols comprising a hollow cylinder having open ends, a top and bottom means for said cylinder and for forming a chamber therewith, a first membrane filter located between said top and said cylinder, a screen for supporting said first membrane, a second membrane filter located between said bottom and said cylinder, a screen for supporting said second membrane, means securely holding said top and said bottom on said cylinder, and entrance and exit means in said bottom and top means, respectively, for circulating a gas under pressure into and out of said chamber.

References Cited by the Examiner

UNITED STATES PATENTS

| | | | |
|---|---|---|---|
| 2,672,431 | 3/1954 | Goetz | 195—103.5 X |
| 2,794,269 | 6/1957 | Isaacs | 34—218 X |
| 2,894,877 | 7/1959 | Sinden | 195—103.5 |
| 3,001,914 | 9/1961 | Andersen | 195—103.5 |

FREDERICK L. MATTESON, Jr., *Primary Examiner.*

BENJAMIN A. BORCHELT, *Examiner.*

W. C. ROCH, *Assistant Examiner.*